US006837503B2

(12) United States Patent
Chen et al.

(10) Patent No.: US 6,837,503 B2
(45) Date of Patent: Jan. 4, 2005

(54) FOLDING WALKER WITH REMOVABLE BACK REST

(75) Inventors: Kuang-Muh Chen, Taichung (TW); Liang Kuo Chen, Taichung (TW)

(73) Assignee: Nova Ortho-Med, Inc., Gardena, CA (US)

( * ) Notice: Subject to any disclaimer, the term of this patent is extended or adjusted under 35 U.S.C. 154(b) by 131 days.

(21) Appl. No.: 10/308,565

(22) Filed: Dec. 3, 2002

(65) Prior Publication Data

US 2004/0104559 A1 Jun. 3, 2004

(51) Int. Cl.[7] .................................................. B62M 1/00
(52) U.S. Cl. .............................. 280/87.021; 280/87.05; 280/650; 280/47.4
(58) Field of Search .......................... 280/42, 641, 643, 280/651, 655, 657, 87.021, 87.041, 39, 250.1; 135/66, 67

(56) References Cited

U.S. PATENT DOCUMENTS 3,688,789 A * 9/1972 Bunch ......................... 135/67
3,800,815 A * 4/1974 Birk ............................ 135/67
4,245,850 A * 1/1981 Boudreau .............. 280/87.051
4,415,198 A 11/1983 Brearley
4,518,002 A * 5/1985 Battiston et al. .............. 135/67
4,907,839 A 3/1990 Rose et al.
5,353,824 A * 10/1994 Woods et al. ................. 135/66
5,558,358 A * 9/1996 Johnson ....................... 280/648
5,704,682 A 1/1998 Gorayeb et al.
5,772,234 A 6/1998 Luo
5,816,593 A * 10/1998 Che ...................... 280/87.041
5,882,067 A 3/1999 Carbajal et al.
5,904,168 A 5/1999 Alulyan
6,311,708 B1 * 11/2001 Howle ......................... 135/67
6,338,355 B1 * 1/2002 Cheng .......................... 135/67
6,378,883 B1 * 4/2002 Epstein .................... 280/250.1
6,481,730 B2 * 11/2002 Sung ....................... 280/87.05

* cited by examiner

*Primary Examiner*—Christopher P. Ellis
*Assistant Examiner*—Bridget Avery
(74) *Attorney, Agent, or Firm*—Blakely, Sokoloff, Taylor & Zafman, LLP

(57) ABSTRACT

A walker having a detachable backrest is described. The walker contains a seat, and a person may sit in the walker, and rest his or her back against the detachable backrest.

5 Claims, 3 Drawing Sheets

FOLDING WALKER WITH REMOVABLE BACK REST

FIELD OF THE INVENTION

This application relates generally to the field of walkers and, more particularly, to a detachable backrest for a walker having a seat.

BACKGROUND

Walkers are commonly used by the elderly, persons with infirmities, and patients recovering from injuries or surgery. A variety of styles of walkers are available. Some have wheels, while others simply have legs tipped with rubber or a similar skid-resistant material.

Persons who use walkers often have a desire to sit down at certain times when they are using their walker. For example, the person may become tired and need to rest, or the person may have taken the walker to view an event, such as a sporting event or a parade, and wishes to use the walker as a seat while viewing the event. In this regard, it is desirable for the walker to have a backrest, to make the use of the seat more comfortable.

SUMMARY OF THE INVENTION

The present invention provides a backrest for use when the seat of the walker is deployed. The backrest is particularly adapted to be detachable for easy stowing. In one embodiment, the backrest conveniently attaches to the walker by inserting ends of the backrest into a housing. The backrest is secured in place, in one embodiment, by a spring-biased peg. The backrest may be padded, so as to provide greater comfort.

BRIEF DESCRIPTION OF THE DRAWINGS

The features, aspects, and advantages of the disclosed subject matter will become more fully apparent from the following Detailed Description and appended claims when taken in conjunction with accompanying illustrations in which:

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. For example, those skilled in the art would understand that the present invention may be used in rollators, as well as walkers. In some instances, detailed descriptions of well-known methods and devices are omitted so as to not obscure the description of the present invention with unnecessary detail.

Figure 1:
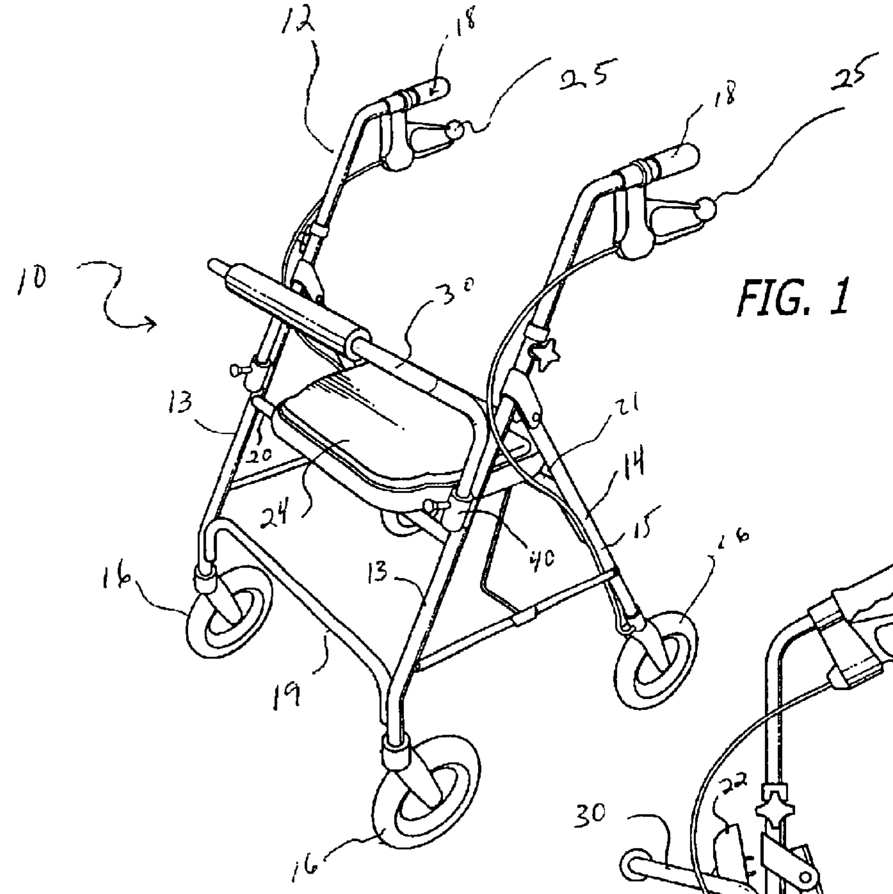
FIG. 1 is an illustration of an elevated perspective view of an embodiment of a folding walker.

FIG. 1 is a perspective view of an embodiment of a folding walker in which the present invention has been incorporated. Walker 10 includes front frame 12 and rear frame 14. Front frame 12 includes front upright members 13. The length of front upright members 13 is telescopically adjustable, so as to accommodate users of varying height. In one embodiment, front cross braces 19 and 20 couple front upright members 13.

Rear frame 14 includes rear upright members 15. Rear cross brace 21 couples rear upright members 15. Grips 18 are affixed to upright members 13. A user holds grips 18 as he or she uses walker 10 to walk. In embodiments where walker 10 includes casters 16, brakes 25 are included in walker 10 and may be applied to slow down or stop at least one of casters 16 from rolling.

In an embodiment, the posterior end of the underside of seat 24 is pivotally coupled to front cross brace 20. The anterior end of the underside of seat 24 has two positions. In the first position, when seat 24 is down, the anterior end of the underside of seat 24 is detachably coupled to rear cross brace 21. In the second position, when seat 24 is pulled up and walker 10 is collapsed for storage, the anterior end of seat 24 is detached from rear cross brace 21. In one embodiment, the anterior end of seat 24 is coupled to rear cross brace 21 with two semi-ring clips (not shown).

In an embodiment, detachable backrest 30 is coupled with front frame 12 by inserting the ends of backrest 30 into housings 40, which are coupled to front frame 12. Detachable backrest 30 may include a single bar, or, in other embodiments, may comprise multiple transverse bars. In an embodiment, backrest 30 is made of a rigid material or materials. In other embodiments, backrest 30 may be made of a flexible material. Those skilled in the art will recognize that seat 24 may also be configured in a manner whereby the posterior end of seat 24, rather than the anterior end, is detachably couple to rear cross brace 21, and the anterior end of seat is pivotally couple to front cross brace 20. Additionally, those skilled in the art will recognize that backrest member 30 may be coupled with rear frame 14.

Figure 2:
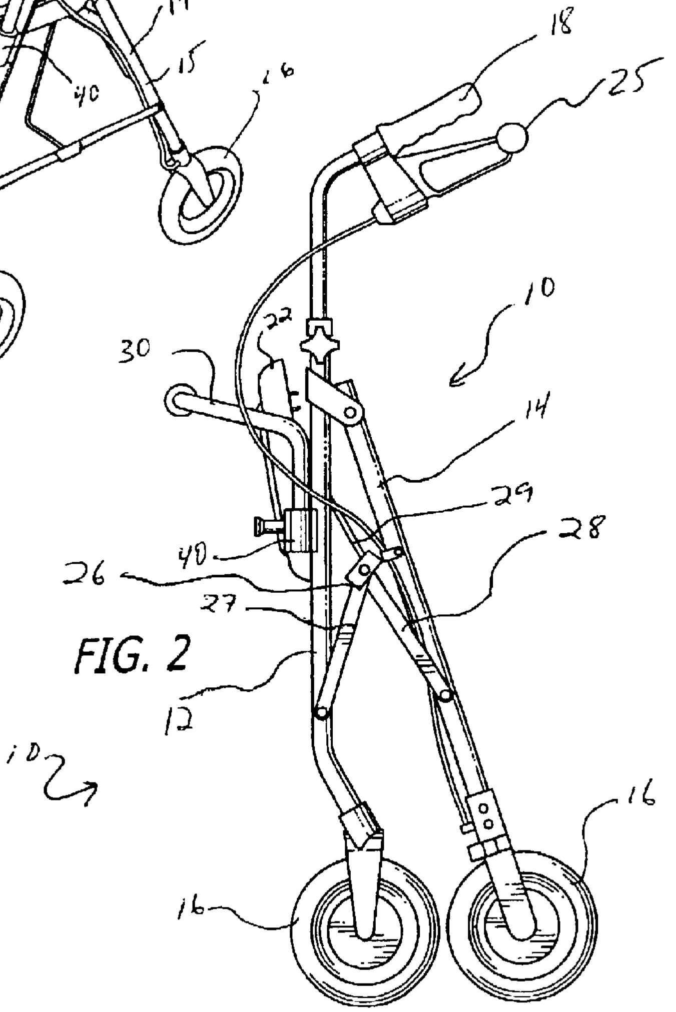
FIG. 2 is an illustration of an perspective view of an embodiment of a folding walker in the folded position.

FIG. 2 is a perspective view of an embodiment of a folding walker in the folded position. Side support assembly 26 includes side support members 27 and 28. Side support member 27 is pivotally coupled to front frame 12, and side support member 28 is pivotally coupled to rear frame 14. The ends of side support members 27 and 28, which are not coupled to either front frame 12 or rear frame 14, are coupled together. Pivot lever 29 is pivotally coupled with both side support assembly 26 and seat 24. When seat 24 is pulled upward and detached from rear cross brace 21, pivot lever 29 pulls side support members 27 and 28 upward, thus drawing front frame 12 and rear frame 14 together, thereby collapsing walker 10, so that it may be easily stowed. In the folded position, backrest 30 may be used as a handle for carrying walker 10 or backrest 30 may be detached, so that folded walker 10 has an even smaller girth, and is more easily stowed.

Figure 3:
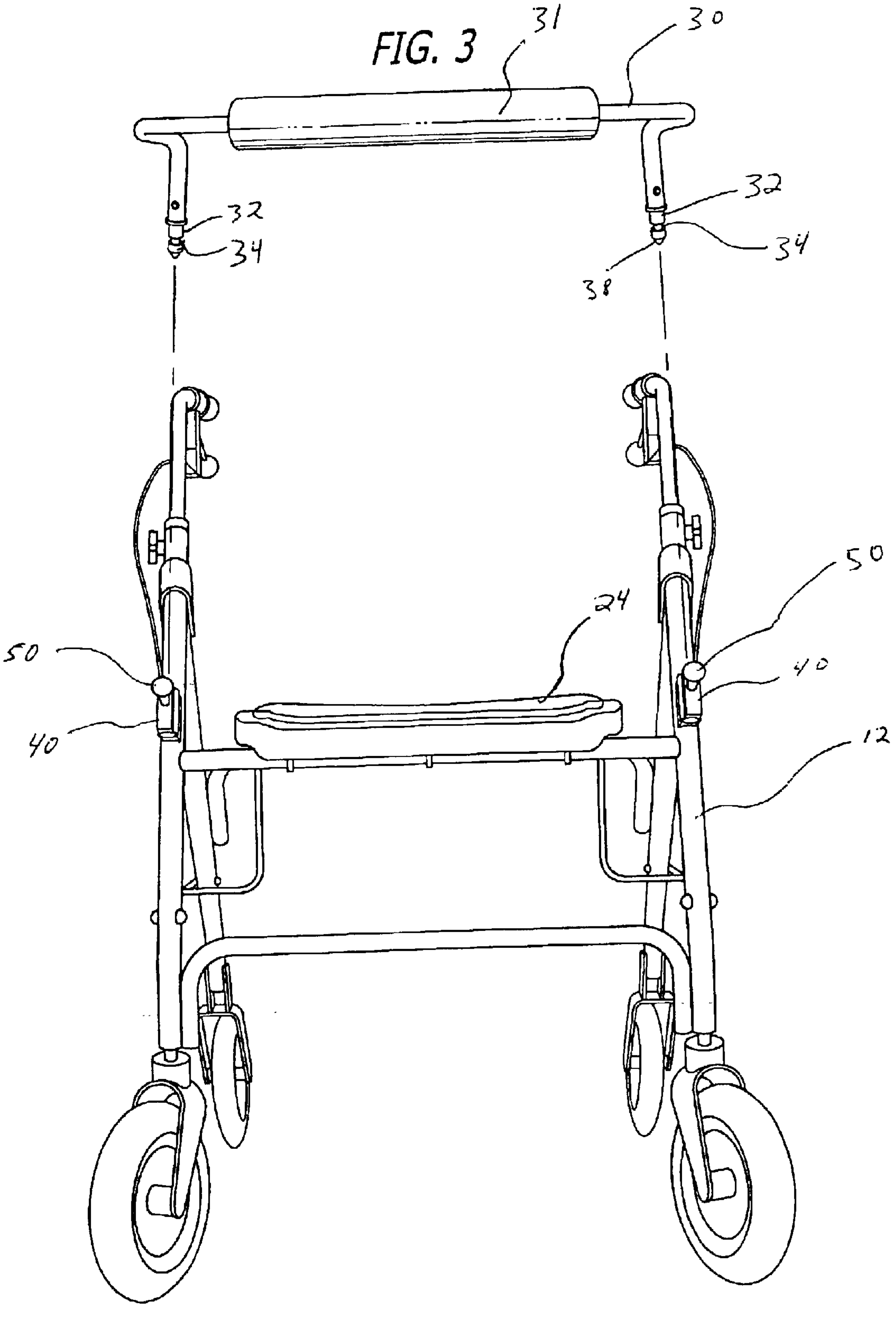
FIG. 3 is an illustration of an exploded view of a detachable backrest in an embodiment of a folding walker.

FIG. 3 is an exploded view of detachable backrest 30. Backrest 30 may be attached to front frame 12 by inserting attaching pegs 32 into peg housings 40. When attaching peg 32 is inserted into peg housing 40, knob 50 protrudes through lock pin hole 43 and into notch 34, and secures backrest 30 in place. A spring (not shown) in peg housing 40 is biased so as to keep an inner portion of knob 50 protruding into notch 34. Backrest 30 may be detached from walker 10 by pulling out knob 50, and removing attaching peg 32 from peg housing 40.

In an embodiment, padding sheath 31 covers a portion of backrest 30. Padding sheath 31 is soft, and makes backrest 30 more comfortable to the seated user. In an embodiment, padding sheath 31 may only cover a portion of backrest 30, but, in other embodiments, padding sheath 31 may cover all of backrest 30. Padding sheath 31 may include multiple independent pieces of padding material, or, it may include only one piece of padding material. In an embodiment, padding sheath 31 includes foam rubber as a padding material. Those skilled in the art will recognize that various materials, soft or firm, will be suitable for padding sheath 31, and the selection of the materials may depend on the particular characteristics or wishes of different users. As such, foam rubber is a representative padding material, and is not to be considered as limiting the scope of the subject matter described and claimed by the inventor.

Attaching pegs 32 are coupled to opposite ends of backrest 30. In an embodiment, backrest 30 is a hollow, cylindrical bar. Also, in such an embodiment, attaching pegs 32 are coupled to backrest 30 by inserting a portion of attaching pegs 32 into opposite hollow ends of backrest 30. The portions of attaching pegs 32 that are inserted into backrest 30 are secured to backrest 30 by rivets, in an embodiment. Attaching pegs 32 include notch 34, in an embodiment. When attaching peg 32 is inserted into peg housing 40, a portion of knob 50 protrudes through lock pin hole 43 into notch 34, thereby keeping backrest bar 30 in a secure position. In an embodiment, attaching pegs 32 includes tapered ends 38, which allows attaching pegs 32 to easily slide into peg housing 40. Attaching peg 32 may also include rim 36, which acts as a stopper, allowing only a specified length of attaching peg 32 to be inserted into receptacle 41, and lining up notch 34 with lock pin hole 43.

Figure 4:
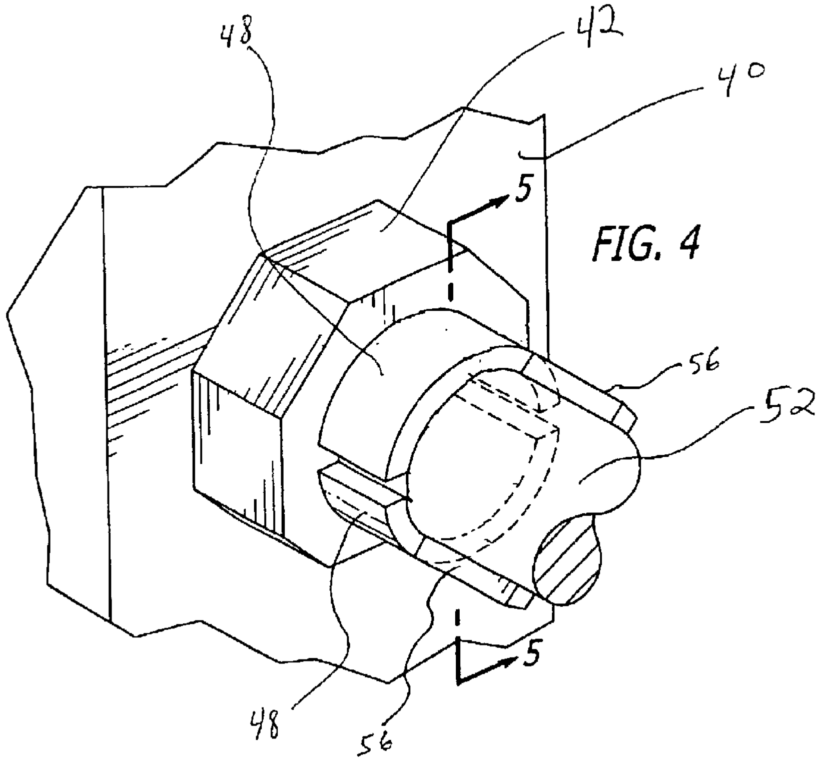
FIG. 4 is an illustration of an elevated cross-sectional view of a portion of an attaching peg and peg housing in an embodiment of a folding walker.

FIG. 4 is a detailed illustration of one embodiment of spring housing 42. In an embodiment, spring housing 42 is coupled to peg housing 40. Spring housing 42 contains a spring (not shown) that is used to bias knob 50 so as to pull knob 50 and lock pin 52 towards peg housing 40 when backrest 30 is attached for use. Lock pin 52 runs through spring housing 42, and, when backrest 30 is attached to front frame 12, forces lock pin head 54 (not shown) into notch 34, thereby holding backrest 30 in a secure position.

Spring housing 42 includes engaging members 48, which may engage with engaging members 56 of knob 50 when backrest 30 is attached to front frame 12. Only when engaging members 48 are engaged with engaging members 56, may lock pin 52 force lock pin head 54 through spring housing 42 and into notch 34 (not shown). FIG. 4 shows engaging members 56 disengaged from engaging members 48. In the disengaged position, lock pin head 54 does not substantially enter notch 34, and backrest 30 may be easily removed from peg housings 40.

Figure 5:
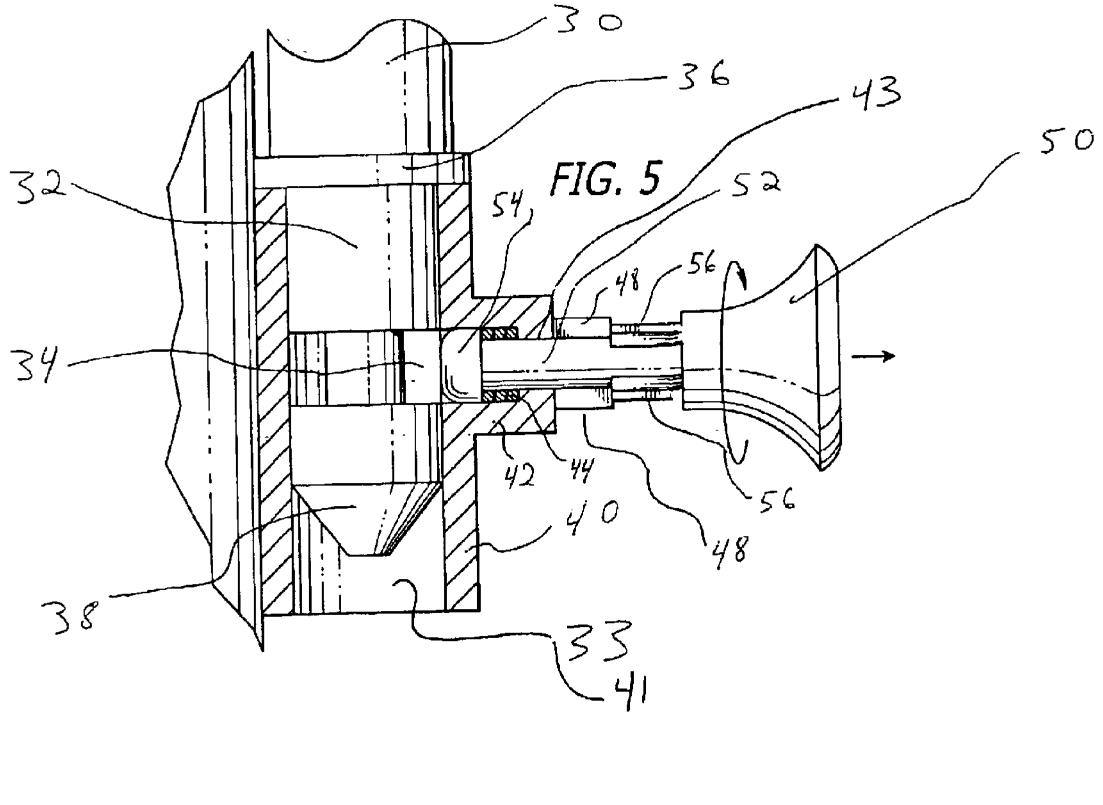
FIG. 5 is a side cross-sectional view of an attaching peg and peg housing in an embodiment of a folding walker.

FIG. 5 is a detailed illustration of one embodiment of peg housing 40 and knob 50. Each peg housing 40 includes receptacle 41. Backrest 30 is attached to front frame 12 by inserting attaching pegs 32 into receptacle 41 of peg housing 40.

In one embodiment, spring housing 42 is coupled to peg housing 40. In other embodiments, spring housing 42 is part of peg housing 40. Spring 44 is disposed inside spring housing 42. Spring 44 biases lock pin 52 and lock pin head 54 toward peg housing 40, so that, when backrest 30 is attached to front frame 12, lock pin head 54 protrudes into notch 34 of attaching peg 32, thus securing backrest 30 in the attached position.

Knob 50, in an embodiment, includes lock pin 52, lock pin head 54, and engaging members 56. In an embodiment, knob 50 is a quarter-turn-locking pin that has two positions. In the protruding position, lock pin head 54 protrudes into notch 34 of attaching peg 32, thereby securing backrest 30 in the attached position. In another embodiment, knob 50 does not include lock pin head 54, and lock pin 52 inserts protrudes into notch 34.

In the non-protruding position, engaging members 48 on spring housing 42 do not engage with engaging members 56 of knob 50. As such, the biasing in spring 44 is unable to pull lock pin head 54 into notch 34. As such, in the non-protruding position of lock pin head 54, backrest 30 is not secured. The non-protruding position of lock pin head 54 facilitates easy detachment of backrest 30, or easy insertion of backrest 30 into peg housing 40.

Those skilled in the art will recognize that other configurations may be used to secure attaching pegs 32 in receptacles 41, and also fall under the subject matter disclosed herein. Likewise, those skilled in the art will also recognize that various structural configurations may be used to prevent lock pin head 54 from entering notch 34 in the non-protruding position, and also fall within the scope of the subject matter disclosed herein.

What is claimed is:

1. A walker comprising:

a front frame comprising two front upright members and a front cross brace coupled to both of the front upright members;

a rear frame comprising two rear upright members and a rear cross brace coupled to both of the rear upright members;

a seat coupled to at least one of the front frame and the rear frame;

a detachable backrest coupled to the front frame;

two backrest mounting assemblies, one on each front upright member, wherein each backrest mounting assembly comprises:

a peg housing, wherein the housing has a receptacle and a lock pin hole, the receptacle of dimensions suitable to receive an attaching peg of the backrest;

a lock pin having a retracted position removed from the lock pin hole but retained in the housing and an inserted position wherein a portion of the lock pin extends through the lock pin hole;

a spring biasing the lock pin toward the inserted position;

wherein the attaching peg is adapted to be retained in the housing when the lock pin is in the inserted position;

wherein the backrest comprises two attaching pegs, each attaching peg comprising:

a first portion having a distal end and a proximal end, the distal end being distal in relation to a center of the backrest, and the proximal end being proximal in relation to the distal end, wherein a section of the first portion is tapered so as to have a diameter that decreases toward the distal end of the first portion;

a second portion, the second portion proximal to the first portion, wherein a section of the second portion has a diameter that is less than a diameter of a section of the first portion, the second portion defining a notch of dimensions suitable to house a portion of the lock pin; and a third portion, the third portion proximal to the second portion, wherein a section of the third portion has a diameter that is greater than the diameter of the section of the second portion.

2. The walker of claim 1, further comprising:

a first side support assembly and a second side support assembly, wherein each side support assembly comprises a first side support member and a second side support member, the first side support member and the second side support member having a first end and a second end, wherein the first end of the first side support member of the first side support assembly is pivotally mounted to a first front upright member of the front frame and the first end of the second side support member of the first side support assembly is pivotally mounted to a first rear upright member of the rear frame, and the second end of the first side support member and the second end of the second side support member are pivotally coupled, and wherein the first end of the first side support member of the second side support assembly is pivotally mounted to a second front upright member of the front frame and the first end of a second side support member of the second side support assembly is pivotally mounted to a second rear upright member of the rear frame, and the second end of the first side support member of the second side support assembly and the second end of the second side support member of the second side support assembly are pivotally coupled.

3. The walker of claim 1, wherein the seat is pivotally mounted to one of the front and frame and the rear frame.

4. The walker of claim 2, wherein the seat is pivotally mounted to one of the front frame and the rear frame, and the walker further comprises at least one pivot lever, the pivot lever comprising a first end and a second end, the first end coupled with the first side support assembly and the second end pivotally coupled with the seat.

5. A walker comprising:

a front frame;

a rear frame;

a seat coupled to at least one of the front frame and the rear frame;

a detachable backrest coupled to the front frame, wherein the backrest includes two attaching pegs, each attaching peg comprising:

a first portion, wherein a first section of the first portion has a diameter and a second section of the first portion proximal to the first section is tapered so as to have a diameter that decreases in a direction away from the first section;

a second portion proximal to the first portion having a diameter that is less than the diameter of the first section of the first portion; and a third portion proximal to the second portion having a diameter that is greater than the diameter of the second portion;

the walker further comprising a pair of backrest mounting assemblies coupled to the front frame, wherein each backrest mounting assembly comprises:

a peg housing, wherein the housing has a receptacle and a lock pin hole, the receptacle of dimensions suitable to receive a respective attaching peg of the backrest;

a lock pin having a retracted position removed from the lock pin hole but retained in the housing and an inserted position wherein a portion of the lock pin extends through the lock pin hole;

a spring biasing the lock pin toward the inserted position;

wherein the second portion of each attaching peg defines a notch having dimensions suitable to receive a portion of a respective lock pin when said respective lock pin is in the inserted position.

* * * * *